(No Model.)

H. R. HAYNES.
FOLDING CUP.

No. 446,774. Patented Feb. 17, 1891.

WITNESSES:
Paul Johot
C. Sedgwick

INVENTOR:
H. R. Haynes
BY Munn & Co.
ATTORNEYS

UNITED STATES PATENT OFFICE.

HOBART R. HAYNES, OF WESTMINSTER, MASSACHUSETTS.

FOLDING CUP.

SPECIFICATION forming part of Letters Patent No. 446,774, dated February 17, 1891.

Application filed November 20, 1890. Serial No. 372,050. (No model.)

*To all whom it may concern:*

Be it known that I, HOBART R. HAYNES, of Westminster, in the county of Worcester and State of Massachusetts, have invented a new and Improved Folding Cup, of which the following is a full, clear, and exact description.

The object of the invention is to provide a new and improved drinking-cup which is simple and durable in construction, and can be readily folded to take up little room, so as to be conveniently carried in a pocket, valise, &c.

The invention consists of a series of spherical lunes hinged together at their ends and overlapping one another.

The invention also consists of certain parts and details and combinations of the same, as will be hereinafter more fully described, and then pointed out in the claims.

Reference is to be had to the accompanying drawings, forming a part of this specification, in which similar letters of reference indicate corresponding parts in all the figures.

Figure 1:
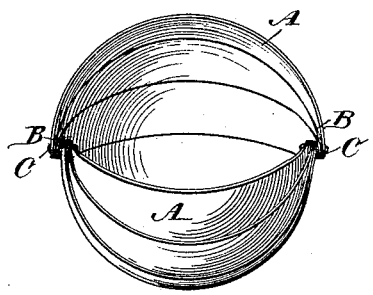
Figure 2:
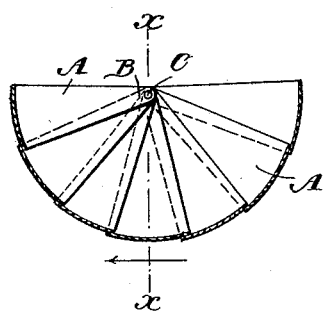
Figure 3:
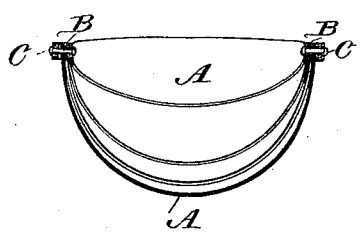
Figure 4:

Figure 1 is a perspective view of the improvement as extended. Fig. 2 is a sectional side elevation of the same. Fig. 3 is a transverse section of the same on the line $x$ $x$ of Fig. 2, and Fig. 4 is a perspective view of one of the lunes.

The improved cup is provided with a series of sections or leaves A, preferably made of tin or other similar material and shaped in the form of a spherical lune, as is plainly shown in the drawings.

The ends B of the several leaves are pivotally connected with each other by pivots C, and the several leaves are so arranged that one overlaps the next following one, as is plainly illustrated in Fig. 2.

As shown in the latter figure, seven leaves are employed, which, when extended, form about a semi-spherical drinking-cup. When folded up, the leaves rest one on top of the other and occupy very little space, so that the cup can be conveniently carried in a pocket.

Suitable means may be employed to limit the movement of the several leaves upon each other, so as to prevent the several leaves from becoming disconnected when the cup is extended, as is shown in Fig. 2. If the cup is made of large dimensions, one of the end leaves may be swung into a vertical position, so as to be used as a bail for carrying the cup.

Having thus fully described my invention, I claim as new and desire to secure by Letters Patent—

1. A folding cup consisting of a series of leaves in the shape of spherical lunes hinged together at their ends and overlapping one another, substantially as shown and described.

2. A folding cup comprising a series of leaves formed in the shape of spherical lunes and overlapping one another, and pivots for connecting the ends of the several leaves with each other, substantially as shown and described.

HOBART R. HAYNES.

Witnesses:
FRANK A. MERRIAM,
FRANK W. DERBY.